United States Patent
Syrivelis et al.

(10) Patent No.: US 12,164,452 B2
(45) Date of Patent: Dec. 10, 2024

(54) HIGH PERFORMANCE MECHANISM FOR EXPORTING PERIPHERAL SERVICES AND OFFLOADS USING DIRECT MEMORY ACCESS (DMA) ENGINE

(71) Applicant: MELLANOX TECHNOLOGIES, LTD., Yokneam (IL)

(72) Inventors: Dimitrios Syrivelis, Volos (GR); Ioannis (Giannis) Patronas, Piraeus (GR); Paraskevas Bakopoulos, Ilion (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/874,802

(22) Filed: Jul. 27, 2022

(65) Prior Publication Data
US 2024/0028534 A1    Jan. 25, 2024

(30) Foreign Application Priority Data
Jul. 20, 2022 (GR) .............................. 2022/0100583

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
None
See application file for complete search history.

(56) References Cited

U.S. PATENT DOCUMENTS

| | | | | |
|---|---|---|---|---|
| 5,754,436 A | * | 5/1998 | Walsh | G06F 9/30083 700/286 |
| 9,032,113 B2 | * | 5/2015 | Conroy | G06F 1/324 710/22 |
| 9,727,501 B2 | * | 8/2017 | Gowravaram | G06F 13/28 |
| 9,727,505 B2 | * | 8/2017 | Conroy | G06F 13/1673 |
| 10,210,113 B2 | * | 2/2019 | Gowravaram | G06F 13/28 |
| 10,387,343 B2 | * | 8/2019 | Ching | G06F 13/24 |
| 10,853,277 B2 | * | 12/2020 | Liang | G06F 13/28 |
| 11,216,396 B2 | * | 1/2022 | Schmisseur | G06F 13/1694 |
| 11,226,915 B2 | * | 1/2022 | Kiyota | G06F 12/0868 |
| 11,301,413 B2 | * | 4/2022 | Cheng | G06F 13/4295 |
| 11,630,601 B2 | * | 4/2023 | Yi | G06F 3/0659 711/154 |
| 2014/0282510 A1 | * | 9/2014 | Anderson | G06F 9/45558 718/1 |
| 2021/0303199 A1 | * | 9/2021 | Horspool | G06F 3/0614 |
| 2021/0389950 A1 | * | 12/2021 | Poole | G06F 9/3802 |

\* cited by examiner

*Primary Examiner* — Henry Tsai
*Assistant Examiner* — Christopher A Bartels
(74) *Attorney, Agent, or Firm* — Anup Iyer; Moore & Van Allen PLLC

(57) ABSTRACT

A high performance mechanism for exporting peripheral services and offloads using Direct Memory Access (DMA) engine is presented. The DMA engine comprises a ring buffer, a DMA memory, and a DMA engine interface operatively coupled to the ring buffer and the DMA memory. The DMA engine interface is configured to retrieve, from the ring buffer, a first DMA request; extract first transfer instructions from the first DMA request; retrieve a first data corresponding to the first DMA request from the DMA memory; and execute the first DMA request using the first data based on at least the first transfer instructions.

21 Claims, 4 Drawing Sheets

HIGH PERFORMANCE MECHANISM FOR EXPORTING PERIPHERAL SERVICES AND OFFLOADS USING DIRECT MEMORY ACCESS (DMA) ENGINE

CROSS-REFERENCE TO RELATED APPLICATIONS

This application claims priority to Greek Patent Application No. 2022/010,0583, filed Jul. 20, 2022, the entire contents of which application are hereby incorporated herein by reference.

FIELD OF THE INVENTION

The present invention relates generally to data communications, and specifically to the process of transferring data, from initiating the transfer to the storage of data at the destination.

BACKGROUND

A Direct Memory Access (DMA) engine is a hardware device that allows peripheral devices to directly access memory with less participation by the processor. However, using conventional DMA engines for frequent, small message transfers (e.g., transfers of cache-lined and sparse access to files, control message passing interface (MPI) messages to remote nodes, or the like) can create overheads.

Therefore, there is a need for a novel DMA engine interface to materialize hardware fast-paths for direct peripheral communication without using the processor for communication orchestration or staging data transfers in the memory.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a Direct Memory Access (DMA) engine for exporting peripheral services and offloads is provided. The DMA engine comprises a ring buffer, a DMA memory, and a DMA engine interface operatively coupled to the ring buffer and the DMA memory. The DMA engine interface is configured to retrieve, from the ring buffer, a first DMA request, extract first transfer instructions from the first DMA request; retrieve a first data corresponding to the first DMA request from the DMA memory; and execute the first DMA request using the first data based on at least the first transfer instructions.

In some embodiments, the DMA engine interface is further configured to transfer the first data from the DMA memory to a first peripheral device based on at least the first transfer instructions.

In some embodiments, the DMA engine interface is further configured to retrieve, from the ring buffer, a second DMA request, extract second transfer instructions from the second DMA request; retrieve a second data corresponding to the second DMA request from a main memory; and execute the second DMA request using the second data based on at least the second transfer instructions.

In some embodiments, the DMA engine interface is further configured to transfer the second data from the main memory to a second peripheral device based on at least the second transfer instructions.

In some embodiments, the first data is a small-size data, and the second data is a large-size data.

In some embodiments, the DMA engine interface is further configured to retrieve, using a DMA engine application, the first DMA request from a peripheral bus, and store the first DMA request in the ring buffer.

In some embodiments, the DMA engine interface is further configured to determine, using the DMA engine application, that the first DMA request is associated with the first data; retrieve, using the DMA engine application, the first data from the peripheral bus; and store the first data in the DMA memory.

In some embodiments, the DMA engine interface is further configured to receive, using the DMA engine application, confirmation that the first data is stored in the DMA memory; and in response to receiving the confirmation, store the first DMA request in the ring buffer.

In another aspect, a system for processing a Direct Memory Access (DMA) request using a DMA engine is presented. The system comprises a DMA engine; a processor operatively coupled to the DMA engine, wherein the processor is configured to generate a first DMA request, wherein the first DMA request is associated with a first data, memory map the first data on a peripheral bus in a linear alignment, and transmit, using the peripheral bus, the first DMA request and the first data to the DMA engine.

In some embodiments, the system further comprises a main memory, wherein the main memory is operatively coupled to the DMA engine and the processor. The processor may be further configured to generate a second DMA request, wherein the second DMA request is associated with a second data; store the second data in the main memory; and transmit, using the peripheral bus, the second DMA request and a location of the second data to the DMA engine. The first data may be a small-size data, and the second data may be a large-size data.

In yet another aspect, a method for processing a Direct Memory Access (DMA) request using a DMA engine is presented. The method comprises retrieving, from a ring buffer, a first DMA request; extracting first transfer instructions from the first DMA request; retrieving a first data corresponding to the first DMA request from a DMA memory; and executing the first DMA request using the first data based on at least the first transfer instructions.

In yet another aspect, a method for memory mapping data on a peripheral bus for transmission to a Direct Memory Access (DMA) engine is presented. The method comprises generating a first DMA request, wherein the first DMA request is associated with a first data; memory mapping the first data on a peripheral bus in a linear alignment; and transmitting, using the peripheral bus, the first DMA request and the first data to the DMA engine.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
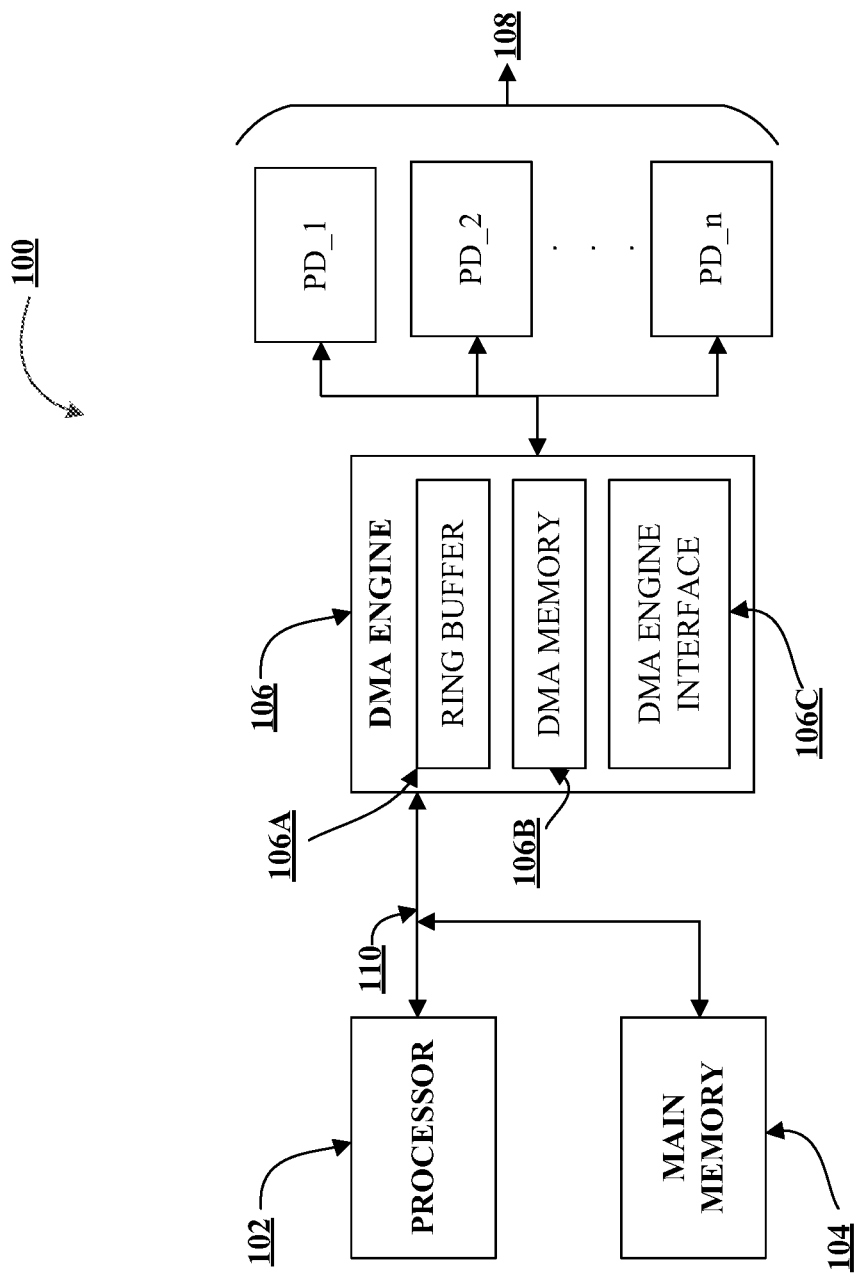
Figure 2:
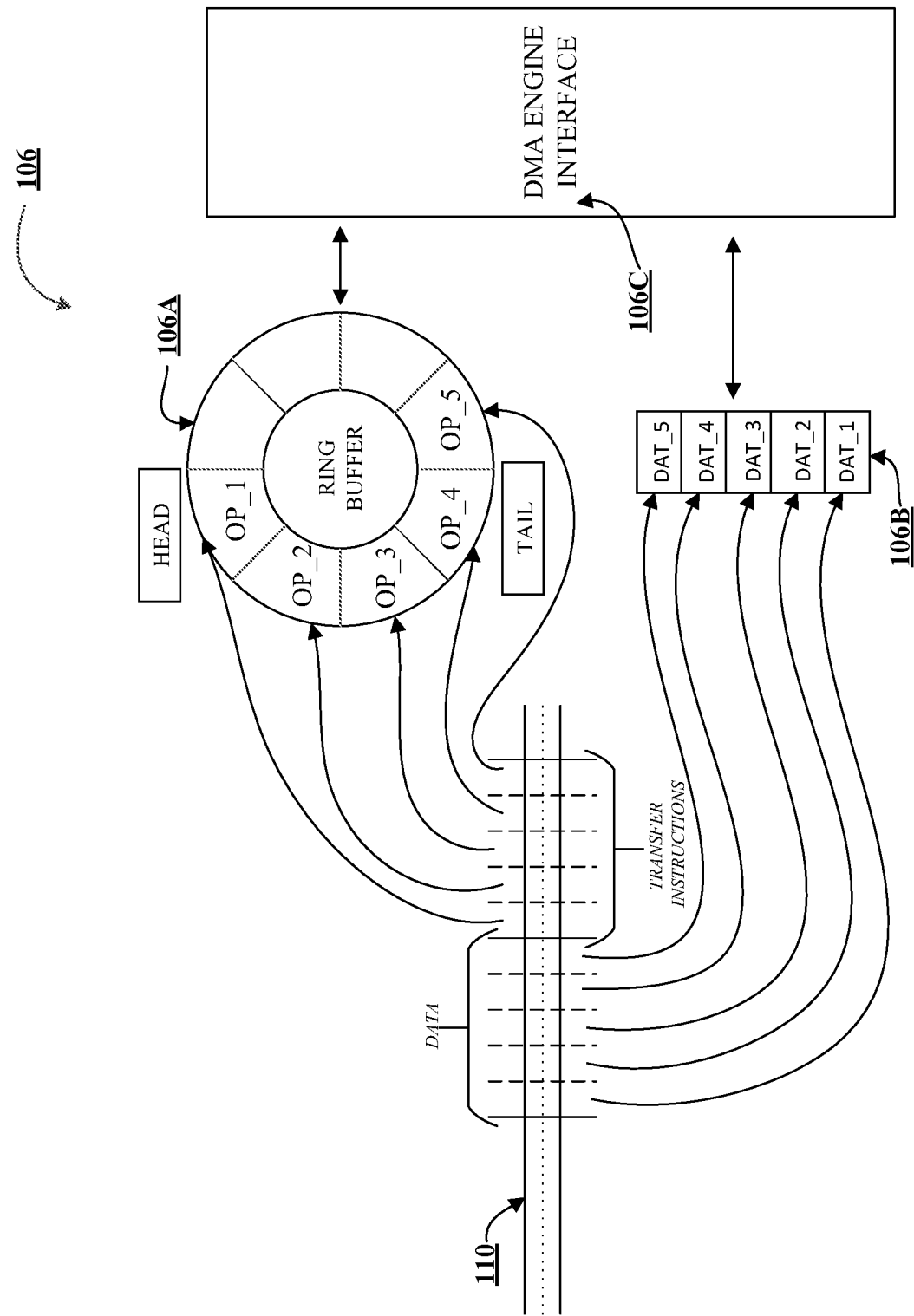
Figure 3:
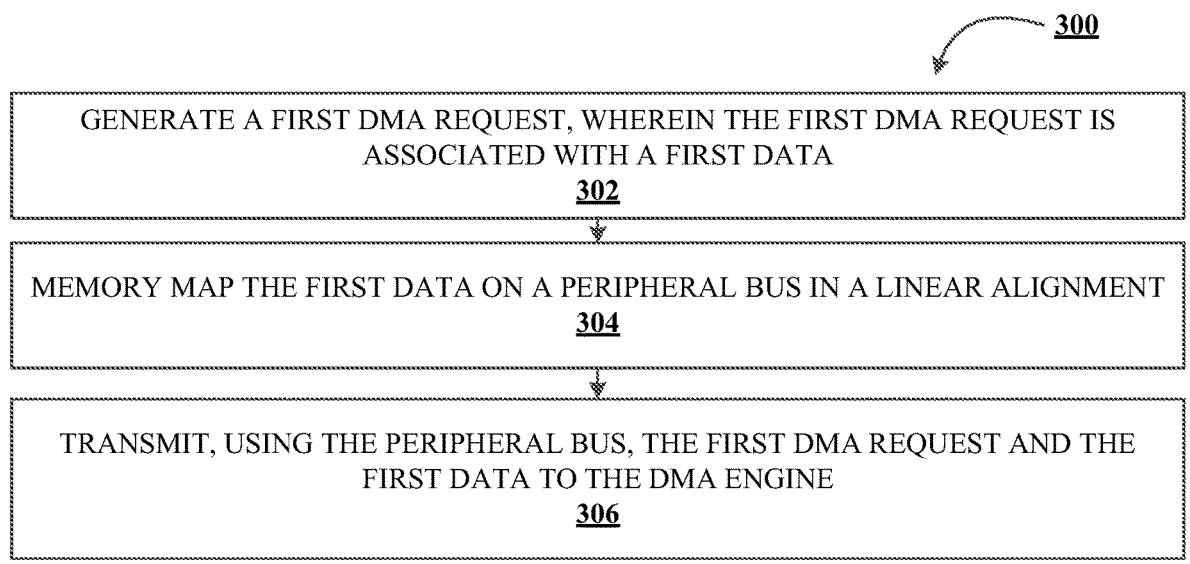
Figure 4:
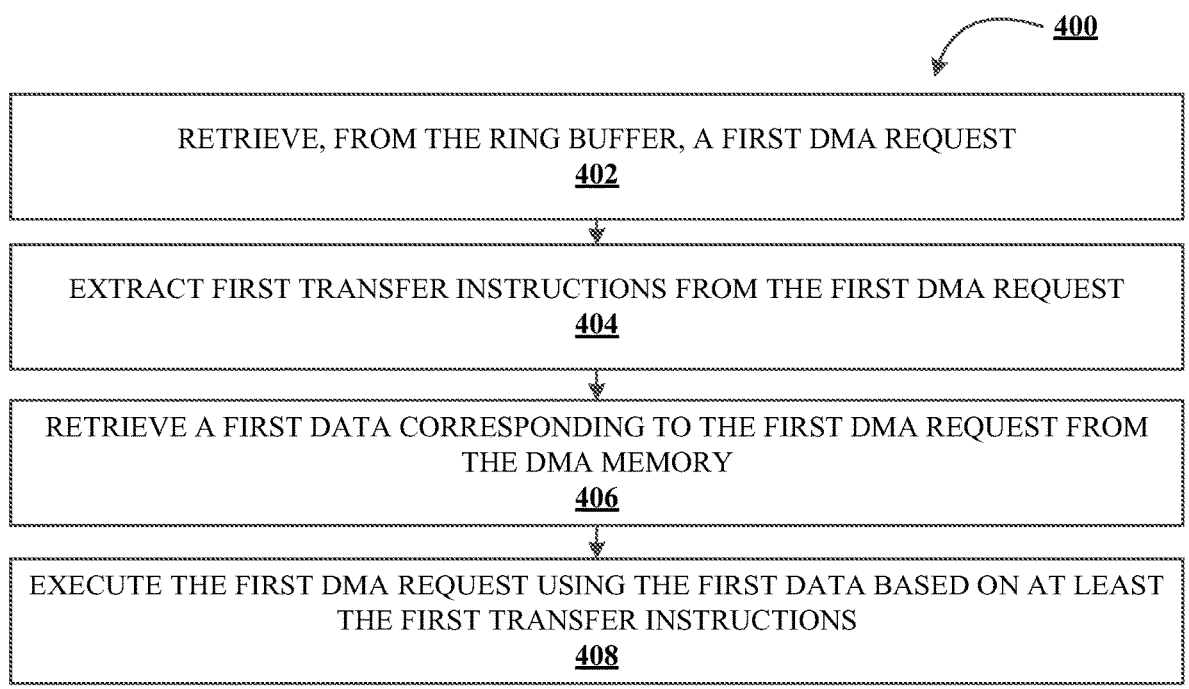

Having thus described embodiments of the invention in general terms, reference will now be made the accompanying drawings, wherein:

FIG. 1 illustrates technical components of an exemplary distributed computing environment for processing a Direct Memory Access (DMA) request using a DMA engine, in accordance with an embodiment of the invention;

FIG. 2 illustrates technical components of the DMA engine, in accordance with an embodiment of the invention;

FIG. 3 illustrates a process flow for memory mapping data on a peripheral bus for transmission to a Direct Memory Access (DMA) engine, in accordance with an embodiment of the invention; and FIG. 4 illustrates a process flow for processing a Direct Memory Access (DMA) request involving a transfer of small-size data using a DMA engine, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, "operatively coupled" may mean that the components are electronically coupled and/or are in electrical communication with one another, or optically coupled and/or are in optical communication with one another. Furthermore, "operatively coupled" may mean that the components may be formed integrally with each other or may be formed separately and coupled together. Furthermore, "operatively coupled" may mean that the components may be directly connected to each other or may be connected to each other with one or more components (e.g., connectors) located between the components that are operatively coupled together. Furthermore, "operatively coupled" may mean that the components are detachable from each other or that they are permanently coupled together.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

It should be understood that the word "exemplary" is used herein to mean "serving as an example, instance, or illustration." Any implementation described herein as "exemplary" is not necessarily to be construed as advantageous over other implementations.

Typically, processors control the process of transferring data, from initiating the transfer to the storage of data at the destination. Using a processor for data transfer adds load on the processor and decreases the overall efficiency of the system. A Direct Memory Access (DMA) engine is a hardware device that allows peripheral devices to directly access memory with less participation by the processor. Thus, a DMA engine behaves as a controller unit and provides an interface between the processor and the peripheral devices. With the DMA engine, even though the processor is not used in the data transfer, the processor is still involved. In a data transfer involving a DMA engine, the processor creates a set of transfer instructions (e.g., access rights, location information of the data in the main memory, and the type of operation to be executed on the data), generates a list structure of the data to be transferred, and stores the transfer instructions and the data in the main memory. Then, the processor initiates the DMA engine by transmitting a DMA select signal (doorbell) to the DMA engine. The DMA engine uses a peripheral bus to fetch the transfer instructions from the main memory and uses the information from the instructions to interact directly with the peripheral devices, independent of the processor, and to execute the data transfer according to the transfer instructions.

However, using conventional DMA engine for frequent, small message transfers (e.g., transfers of cache-lined instructions for access to files, control message passing interface (MPI) messages to remote nodes, or the like) can create overheads. New peripheral buses such as PCI-e CXL extension, IBM OpenCAPI, NVIDIA NVLink, or the like, allow for direct attachment of peripherals on the main system on chip (SoC) system interconnect. Accordingly, peripheral devices can now be mapped directly in the physical address space of the processor, instead of leveraging narrow windows of the classic peripheral bus bridges. Also, peripheral devices can now directly receive loads and stores from the peripheral bus and have the ability to directly respond to the transactions. Furthermore, peripheral devices can now also write data to the memory while being cache coherent. Because the capability of the DMA engine is often defined by the functionalities of the peripheral bus, with the advent of new peripheral bus support, there is an opportunity to revisit DMA engines and their interfaces to address the overheads associated with frequent, small message transfers.

Accordingly, the present invention employs a ring buffer structure and an associated DMA memory that is implemented on the peripheral device side, i.e., the same side of the peripheral bus where the DMA engine is located to improve the efficiency of data transfers. The ring buffer may be configured to store DMA requests. The DMA memory may be a high-speed internal memory used for temporary storage of the data corresponding to the DMA requests. When there is a need for frequent, small data access, the processor may transmit a DMA request to the DMA engine via the peripheral bus. The DMA request may include the type of operation to be executed on the data. In cases where the DMA request is associated with small-sized data, the processor memory maps the small-size data on the peripheral bus and transmits the data along with the DMA request. The small-size data may be extracted by the DMA engine and stored in the DMA memory, while the DMA request may be stored in the ring buffer. On the other hand, if the data is large-size data, the DMA request is accompanied by a location information of the large-size data in the main memory. The DMA engine interface on the peripheral device side may monitor all the DMA requests placed in the ring buffers and may schedule corresponding hardware operations to satisfy them. Accordingly, when the processor needs to exchange very frequent small messages with peripherals, it does not need to stage transfers to the main memory. Instead, according to embodiments described herein, the processor transmits data to the DMA engine by memory mapping the data on a peripheral bus.

FIG. 1 illustrates technical components of an exemplary system for processing a Direct Memory Access (DMA) request using a DMA engine 100, in accordance with an embodiment of the invention. FIG. 1 illustrates only one example of an embodiment of the system 100, and it will be appreciated that in other embodiments one or more of the processors, memories, devices, and/or servers may be combined into a single system, device, or server, or be made up of multiple systems, devices, or servers. Also, the system 100 may include a processor 102 or multiple processors, the same or similar to processor 102, with each processor providing portions of the necessary operations. It is to be understood that the structure of the system 100 and its components, connections, and relationships, and their functions, are meant to be exemplary only, and are not meant to limit implementations of the inventions described and/or claimed in this document. In one example, the system 100 may include more, fewer, or different components. In another example, some or all of the portions of the system 100 may be combined into a single portion or all of the portions of the system 100 may be separated into two or more distinct portions.

As shown in FIG. 1, the system 100 contemplated herein may include a processor 102, a main memory 104, a DMA engine 106, and peripheral devices (PD_1 . . . PD_n) 108. Each of the components 102, 104, 106, and 108 may be operatively coupled to one another using various buses and may be mounted on a common motherboard or in other manners as appropriate. In some embodiments, the processor 102, the main memory 104, and the DMA engine 106 may be operatively coupled using a peripheral bus 110.

The processor 102 may be configured to execute instructions, including instructions stored in the main memory 104, which in one embodiment includes the instructions of an application that may perform the functions disclosed herein, including certain logic, data transferring, data processing, and data storing functions. To this end, the processor 102, the source, may be configured to provide necessary transfer descriptors, such as control information, addresses, data block size, and/or the like, to the DMA engine 106 via the peripheral bus 110, to execute data transfers with the peripheral devices 108. The processor 102 may be implemented as a chipset of chips that include separate and multiple analog and digital processors. The processor 102 may be configured to provide, for example, for coordination of the other components of the peripheral devices 108, such as control of user interfaces, applications run by peripheral devices 108, and wireless communication by peripheral devices 108.

The main memory 104 may store information within the system 100. In one implementation, the main memory 104 may be a volatile memory unit or units, such as volatile random access memory (RAM) having a cache area for the temporary storage of information, such as a command, a current operating state of the system 100, an intended operating state of the system 100, instructions related to various methods and/or functionalities described herein, and/or the like. In another implementation, the main memory 104 may be a non-volatile memory unit or units. The main memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. In some embodiments, the main memory 104 may include a storage device that may be capable of providing mass storage for the system 100. In one aspect, the storage device may be or contain a computer-readable medium, such as a floppy disk device, a hard disk device, an optical disk device, or a tape device, a flash memory or other similar solid state memory device, or an array of devices, including devices in a storage area network or other configurations. During operations, the main memory 104 may be configured to store large-size data, i.e., data that is greater than a bus width associated with the peripheral bus 110. This data may either be data that is intended for transfer to peripheral devices 108 or data that has been received from the peripheral devices 108.

The peripheral bus 110 may be a bidirectional interface that is configured to support peripheral devices 108. To this end, the peripheral bus 110 may be a cache coherent, high-speed processor expansion bus with low latency, high data transfer rates, and shared memory. In some embodiments, the peripheral bus may be capable of being used in large data center computers for directly connecting Central Processing Units (CPUs) to external accelerators like Graphics Processing Units (GPUs), Application Specific Integrated Circuit (ASIC), Field Programmable Gate Arrays (FPGAs), or fast storage.

To execute a data transfer using a conventional DMA engine, a source (e.g., processor) may generate a set of transfer instructions and initiate the DMA engine to execute the data transfer according to the transfer descriptors. When the transfer is completed, the conventional DMA engine may inform the processor by raising an interrupt signal. However, for conventional DMA engines to function efficiently, the volume of data of a single data transfer needs to be large enough to compensate for the time it takes to program the DMA engine to go back and forth on the peripheral bus. With fine-grained disaggregation, the requirement for tighter cooperation of resources, and the need for interleaving of finer grained offloads, having sufficient volume of data for transfer may not always be sufficient. In cases where there is a need for frequent, small message transfers (e.g., transfers of cache-lined and sparse access to files, control message passing interface (MPI) messages to remote nodes, or the like) the use of a conventional DMA engine may cause overhead.

According to embodiments of the present invention, the DMA engine 106 addresses this issue by employing a ring buffer 106A, a DMA memory 106B, and a DMA engine interface 106C, as shown in FIG. 1. The DMA engine 106 may be a hardware device that allows input/output devices, such as the peripheral devices 108, to directly access the main memory 104, with less participation from the processor 102. The ring buffer 106A and the DMA memory 106B may be flexibly instantiated on the source side (e.g., processor side), a target side (e.g., peripheral device side), or any other device memory side. As such, the ring buffer 106A and the DMA memory 106B may be used to execute the transfer of data without the need for explicit signaling of their initiation and completion.

The peripheral devices 108 may be end-point devices that provide input/output (I/O) functions for a computer and may serve as auxiliary computer devices without computing-intensive functionality. Peripheral devices may connect with a computer through several I/O interfaces, such as communications (COM), Universal Serial Bus (USB) and serial ports such as serial advanced technology attachment (SATA) ones. Peripheral devices 108 may be broadly categorized into input peripheral devices, output peripheral devices, and storage peripheral devices. Input peripheral devices convert incoming instructions or actions from the user into viable information that can be interpreted by the computer. For example, a keyboard will convert keystroke into characters that appear on the computer's display. Output peripheral devices translate digital signals into information that can be interpreted or utilized by the end user. For example, a monitor or display screen will show the operating system's desktop. Storage peripheral devices are used to store and record data and include internal and external hard drives, CD-ROM and DVD drives, and flash memory drives. Furthermore, depending on whether the peripheral is located inside or outside the computer system case, it can be further classified as an internal or external peripheral device.

Various implementations of the system 100, including the processor 102, main memory 104, DMA engine 106, and techniques described herein can be realized in digital electronic circuitry, integrated circuitry, specially designed ASICs (application specific integrated circuits), computer hardware, firmware, software, and/or combinations thereof.

FIG. 2 illustrates technical components of the DMA engine 106, in accordance with an embodiment of the invention. As shown in FIG. 2, the DMA engine 106 may include a ring buffer 106A, a DMA memory 106B, and a DMA engine interface 106C. The DMA engine 106 may receive transfer requests from the processor 102 via the peripheral bus 110. Each transfer request may include transfer instructions and corresponding data. The transfer instructions may be stored in the ring buffer 106A, and the corresponding data, depending on its size, may be stored either in the DMA memory 106B or the main memory 104.

The ring buffer 106A may be a lock-free data structure that is used as a data queue for asynchronous data transfer between a source and a target. As shown in FIG. 2, the ring buffer 106A is implemented on the peripheral side, where the DMA engine interface 106C is the intended target. In some embodiments, the ring buffer 106A may be configured to store data operations OP_1, OP_2, . . . , OP_5 detailing data transfer instructions. The DMA requests may be added to the tail of the queue in a "FIFO" (first in-first out) fashion, such that the first DMA requests are removed from the head in the order they were added. When the head pointer gets to the end of the array, it wraps around to the first DMA request in the array, and any data in the ring buffer 106A is overwritten. The head of the queue is different from the first DMA request in the actual array and both pointers move as the DMA requests are added and removed. In some embodiments, the DMA requests may be retrieved from the peripheral bus 110 and safely added to the ring buffer 106A at any point in time without causing any dependency issues with the DMA engine interface 106C, barring depleting the storage space. In the same way, the DMA engine interface 106C may operate independently of the DMA requests being added to the ring buffer 106A as long as there is content in the ring buffer 106A.

The DMA memory 106B may be a high-speed internal memory used to store small-size data, e.g., data that is smaller in size than a bus width associated with the peripheral bus 110, for rapid retrieval. According to embodiments of the invention, the use of the DMA memory 106B ensures a low latency access to data stored thereon. The DMA engine interface 106C may be a hardware device and/or a software program that monitors incoming DMA requests and schedules corresponding hardware operations to satisfy them. To this end, the DMA engine interface 106C may include a DMA engine application that is configured to process incoming DMA requests received by the DMA engine 106.

As shown in FIG. 2, in cases where the DMA request is associated with small-sized data (e.g., first data), the processor memory maps the small-size data on the peripheral bus 110 and transmits the small-size data along with the DMA request. In such embodiments, the small-size data and the DMA request are received by the DMA engine 106. The DMA engine 106 may be configured to retrieve, using the DMA engine application, the small-size data from the peripheral bus 110 and store the small-size data in the DMA memory 106B. In addition, the DMA engine 106 may be configured to retrieve, using a DMA engine application, the DMA request from the peripheral bus 110 and store the DMA request in the ring buffer 106A. In some embodiments, the DMA engine 106 may be configured to receive confirmation that the small-size data is received in the DMA memory 106B before storing the DMA request in the ring buffer 106A, thereby ensuring seamless data transfer operations.

In some cases, the DMA request may be associated with large-size data (e.g., second data), e.g., data that is larger in size than a bus width associated with the peripheral bus 110 and is too large to be incorporated directly on to the shared memory of the peripheral bus 110. In such cases, the processor 102 may revert to its traditional method of handling data transfers, where the large-size data is stored in the main memory 104, and the corresponding DMA request (e.g., second DMA request) is accompanied by location information of the large-size data in the main memory 104. The DMA request and the location information may be received by the DMA engine 106. The DMA engine 106 may be configured to retrieve, using the DMA engine application, the DMA request from the peripheral bus 110 and store the DMA request in the ring buffer 106A. In some embodiments, the DMA engine 106 may be configured to receive confirmation that the large-size data is received in the main memory 104 before storing the DMA request in the ring buffer 106A, thereby ensuring seamless data transfer operations.

FIG. 3 illustrates a process flow for memory mapping data on a peripheral bus for transmission to a Direct Memory Access (DMA) engine 300, in accordance with an embodiment of the invention. As shown in block 302, the process flow includes generating a first DMA request, wherein the first DMA request is associated with a first data. In some embodiments, the first DMA request may include first transfer instructions. The first transfer instructions may include a set of steps of documentation detailing operations to be executed on the first data. For example, the first transfer instructions may include instructions such as access rights, location information of the data in the memory, and the type of operation to be executed on the data intended for transfer to peripheral devices.

Next, as shown in block 304, the process flow may include memory mapping the first data on a peripheral bus in a linear alignment. The first data may be small-size data, e.g., data that is smaller in size than a bus width of the peripheral bus. By memory mapping the first data in a linear alignment on the peripheral bus, the first data may be directly and linearly incorporated into the address space of the peripheral bus. This may reduce the input/output data movement because the first data does not have to be copied into process data buffers, as is done by traditional read and write subroutines.

Next, as shown in block 306, the process flow may include transmitting, using the peripheral bus, the first DMA request and the first data to the DMA engine. In some embodiments, a ring buffer may be implemented on the source side, i.e., the processor side, to organize the first data and the first DMA request for transmission on the peripheral bus. Similar to the ring buffer 106A, the ring buffer implemented on the source side may receive the first DMA request from the processor and store the first DMA request in the circular buffer. In such embodiments, the first DMA request is added to the tail of the queue in a "FIFO" (first in-first out) fashion and is removed from the head of the queue based on the order in which it was added.

FIG. 4 illustrates a process flow for processing a Direct Memory Access (DMA) request involving a transfer of small-size data using a DMA engine 400, in accordance with an embodiment of the invention. As shown in block 402, the process flow may include retrieving, from a ring buffer, a first DMA request. Next, as shown in block 404, the process flow may include extracting first transfer instructions from the first DMA request. In some embodiments, the DMA engine may be configured to determine that the first DMA request is associated with the first data from the first transfer instructions. Next, as shown in block 406, the process flow may include retrieving a first data corresponding to the first DMA request from a DMA memory. Next, as shown in block 408, the process flow may include executing the first DMA request using the first data based on at least the first transfer instructions. In some embodiments, executing the first DMA request may include transferring the first data from the DMA memory to a first peripheral device based on at least the first transfer instructions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

While certain exemplary embodiments have been described and shown in the accompanying drawings, it is to be understood that such embodiments are merely illustrative of, and not restrictive on, the broad invention, and that this invention not be limited to the specific constructions and arrangements shown and described, as various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A Direct Memory Access (DMA) engine that is integrated through a peripheral bus that connects peripheral devices directly to a main System on Chip (SoC) framework, the DMA engine comprising:
   a ring buffer;
   a DMA memory; and
   a DMA engine interface operatively coupled to the ring buffer and the DMA memory, wherein the DMA engine interface is configured to:
      retrieve, from the ring buffer, a first DMA request to transfer a first data from the DMA memory to a first peripheral device;
      extract first transfer instructions from the first DMA request;
      retrieve the first data corresponding to the first DMA request from the DMA memory; and execute the first DMA request using the first data based on at least the first transfer instructions,
  wherein the first DMA request and the first data are received via the peripheral bus, and
  wherein a size of the first data is less than a width of the peripheral bus.

2. The DMA engine of claim 1, wherein the DMA engine interface is further configured to transfer the first data from the DMA memory to the first peripheral device based on at least the first transfer instructions.

3. The DMA engine of claim 1, wherein the DMA engine interface is further configured to:
  retrieve, from the ring buffer, a second DMA request;
  extract second transfer instructions from the second DMA request;
  retrieve a second data corresponding to the second DMA request from a main memory; and
  execute the second DMA request using the second data based on at least the second transfer instructions.

4. The DMA engine of claim 3, wherein the DMA engine interface is further configured to transfer the second data from the main memory to a second peripheral device based on at least the second transfer instructions.

5. The DMA engine of claim 3, wherein the first data is a small-size data, and the second data is a large-size data.

6. The DMA engine of claim 1, wherein the DMA engine interface is further configured to:
  retrieve, using a DMA engine application, the first DMA request from the peripheral bus; and
  store the first DMA request in the ring buffer.

7. The DMA engine of claim 6, wherein the DMA engine interface is further configured to:
  determine, using the DMA engine application, that the first DMA request is associated with the first data;
  retrieve, using the DMA engine application, the first data from the peripheral bus; and
  store the first data in the DMA memory.

8. The DMA engine of claim 6, wherein the DMA engine interface is further configured to:
  receive, using the DMA engine application, confirmation that the first data is stored in the DMA memory; and
  in response to receiving the confirmation, store the first DMA request in the ring buffer.

9. A system for processing a Direct Memory Access (DMA) request using a DMA engine that is integrated using a peripheral bus that connects peripheral devices directly to a main System on Chip (SoC) framework, comprising:
  a DMA engine; and
  a processor operatively coupled to the DMA engine, wherein the processor is configured to:
    generate a first DMA request, wherein the first DMA request comprises first transfer instructions to transfer a first data from the DMA memory to a first peripheral device, wherein a size of the first data is less than a width of the peripheral bus;
    memory map the first data on the peripheral bus in a linear alignment; and
    transmit, using the peripheral bus, the first DMA request and the first data to the DMA engine.

10. The system of claim 9, wherein the DMA engine further comprises:
  a ring buffer;
  a DMA memory; and
  a DMA engine interface operatively coupled to the ring buffer and the DMA memory, wherein the DMA engine interface is further configured to:
    retrieve, from the ring buffer, the first DMA request;
    extract first transfer instructions from the first DMA request;
    retrieve the first data corresponding to the first DMA request from the DMA memory; and
    execute the DMA request using the first data based on at least the first transfer instructions.

11. The system of claim 10, wherein the DMA engine interface is further configured to transfer the first data from the DMA memory to the first peripheral device based on at least the first transfer instructions.

12. The system of claim 10, further comprising:
  a main memory, wherein the main memory is operatively coupled to the DMA engine and the processor,
  wherein the processor is further configured to:
    generate a second DMA request, wherein the second DMA request is associated with a second data;
    store the second data in the main memory; and
    transmit, using the peripheral bus, the second DMA request and a location of the second data to the DMA engine,
  wherein the first data is a small-size data, and the second data is a large-size data.

13. The system of claim 12, wherein the DMA engine interface is further configured to:
  retrieve, from the ring buffer, the second DMA request;
  extract second transfer instructions from the second DMA request;
  retrieve the second data corresponding to the second DMA request from the main memory; and
  execute the second DMA request using the second data based on at least the second transfer instructions.

14. The system of claim 13, wherein the DMA engine interface is further configured to transfer the second data from the main memory to a second peripheral device based on at least the second transfer instructions.

15. A method for processing a Direct Memory Access (DMA) request using a DMA engine that is integrated using a peripheral bus that connects peripheral devices directly to a main System on Chip (SoC) framework, the method comprising:
  retrieving, from a ring buffer, a first DMA request;
  extracting first transfer instructions from the first DMA request to transfer a first data from the DMA memory to a first peripheral device;
  retrieving the first data corresponding to the first DMA request from a DMA memory; and
  executing the first DMA request using the first data based on at least the first transfer instructions,
  wherein the first DMA request and the first data are received via the peripheral bus, and
  wherein a size of the first data is less than a width of the peripheral bus.

16. The method of claim 15, wherein executing further comprises transferring the first data from the DMA memory to the first peripheral device based on at least the first transfer instructions.

17. The method of claim 15, wherein the method further comprises:
  retrieving, from the ring buffer, a second DMA request;
  extracting second transfer instructions from the second DMA request;
  retrieving a second data corresponding to the second DMA request from the main memory; and
  executing the second DMA request using the second data based on at least the second transfer instructions.

18. A method for memory mapping data on a peripheral bus, the peripheral bus directly connecting peripheral devices to a main System on Chip (SoC) framework for transmission to a Direct Memory Access (DMA) engine, the method comprising:
   generating a first DMA request, wherein the first DMA request comprises first transfer instructions to transfer a first data from the DMA memory to a first peripheral device, wherein a size of the first data is less than a width of the peripheral bus;
   memory mapping the first data on the peripheral bus in a linear alignment; and
   transmitting, using the peripheral bus, the first DMA request and the first data to the DMA engine.

19. The method of claim 18, wherein the method further comprises:
   generating a second DMA request, wherein the second DMA request is associated with a second data;
   storing the second data in a main memory; and
   transmitting, using the peripheral bus, the second DMA request and a location of the second data to the DMA engine.

20. The method of claim 19, wherein the first data is a small-size data, and the second data is a large-size data.

21. A system for processing a Direct Memory Access (DMA) request using a DMA engine that is integrated using a peripheral bus that connects peripheral devices directly to a main System on Chip (SoC) framework, comprising:
   a DMA engine; and
   a processor operatively coupled to the DMA engine, wherein the processor is configured to:
      generate a first DMA request, wherein the first DMA request comprises first transfer instructions to transfer a small-size data from the DMA memory to a first peripheral device, wherein a size of the small-size data is less than a width of the peripheral bus;
      memory map the small-size data on the peripheral bus in a linear alignment; and
      transmit, using the peripheral bus, the first DMA request and the small-size data to the DMA engine.

* * * * *